United States Patent [19]

Loomer

[11] 4,326,692
[45] Apr. 27, 1982

[54] MIRROR BRACKET

[75] Inventor: Weston R. Loomer, Walton, Ky.

[73] Assignee: Litton Systems, Inc., Florence, Ky.

[21] Appl. No.: 73,194

[22] Filed: Sep. 7, 1979

Related U.S. Application Data

[62] Division of Ser. No. 890,219, Mar. 27, 1978, Pat. No. 4,218,616.

[51] Int. Cl.³ .............................................. A47F 7/14
[52] U.S. Cl. ................................... 248/488; 350/299
[58] Field of Search ............... 248/488, 475 R, 225.1, 248/68 R; 40/490, 491; 350/299, 288

[56] References Cited

U.S. PATENT DOCUMENTS

| | | | |
|---|---|---|---|
| 821,846 | 5/1906 | Allen et al. ..................... | 350/288 X |
| 1,724,029 | 8/1929 | Hodny ............................ | 248/488 X |
| 2,053,124 | 9/1936 | Banks ............................. | 248/488 |
| 2,669,964 | 2/1954 | Wexler ........................... | 40/491 X |
| 2,997,265 | 8/1961 | Weiss ............................. | 248/68 R |
| 3,565,385 | 2/1971 | Zurawski ....................... | 248/68 R X |
| 4,253,629 | 3/1981 | Wilmes ........................... | 248/68 R |

Primary Examiner—J. Franklin Foss
Attorney, Agent, or Firm—Herbert A. Stern

[57] ABSTRACT

A system for determining the position of vehicles in an automated warehouse of the type utilizing transfer vehicles and robot vehicles is disclosed. The position determining system includes a photo-electric sensor flexibly coupled to a robot vehicle, which sensor is responsive to its alignment with a pallet stored in the warehouse. The system further includes a photo-electric reflector retaining bracket mounted adjacent to an aisle in the warehouse, the bracket supporting a number of reflectors arranged in a pattern containing information identifying the aisle. A photo-electric transceiver supported by a mounting bracket is connected to a transfer vehicle and is arranged to provide an output signal related to the pattern of the reflectors when the transceiver is in alignment with the reflectors whereby the transfer vehicle is apprised of its location in the warehouse. The system also includes an activation reflector having a smaller reflective expanse than the pattern forming reflectors, the activation reflector being used to activate the pattern responsive portion of the transceiver. The system further includes a pair of fine alignment photo-electric transceivers which serve to finely align the transfer vehicle by requiring the vehicle to search for a position in which the two fine alignment transceivers are simultaneously aligned with a reflector supported by the retaining bracket.

4 Claims, 10 Drawing Figures

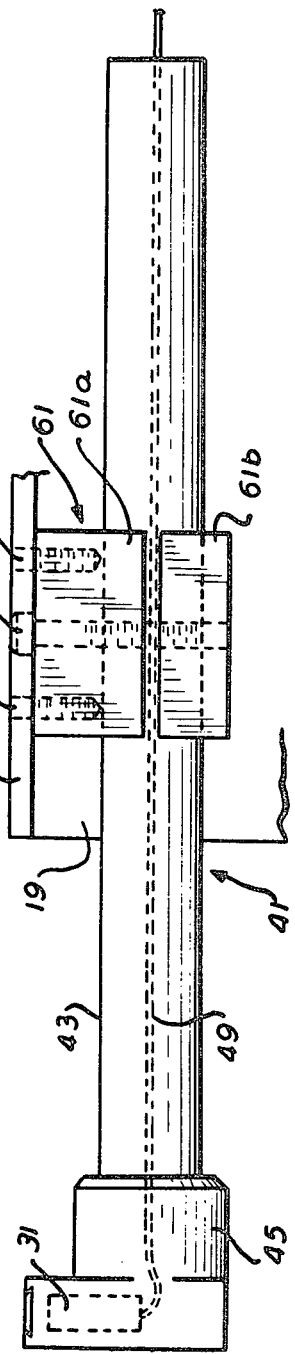
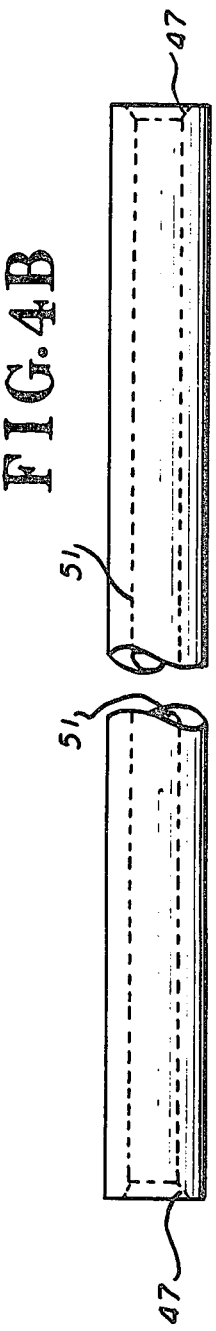
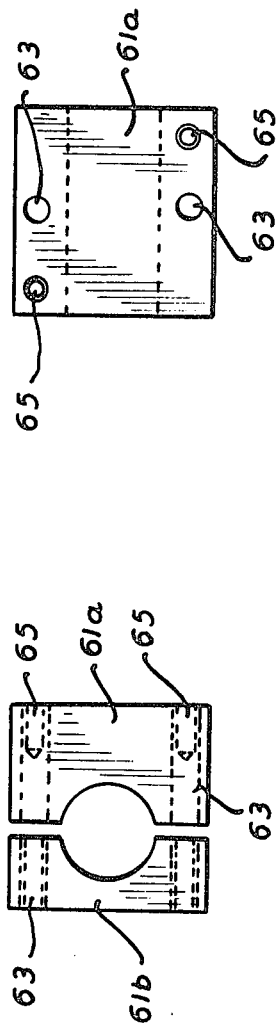
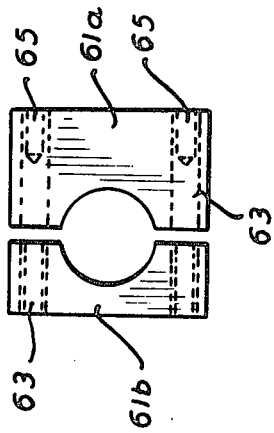

MIRROR BRACKET

This is a division of application Ser. No. 890,219, filed Mar. 27, 1978, now U.S. Pat. No. 4,218,616.

This abstract is not to be taken either as a complete exposition or as a limitation of the present invention, however, the full nature and extent of the invention being discernible only by reference to and from the entire disclosure.

BACKGROUND OF THE INVENTION

This invention relates to an automated storage and retrieval system and more particularly to such a system including a vehicle position determining system.

Automated storage and retrieval systems of the type presently known in the art are generally rack structures which include a plurality of lanes and a number of aisles which extend orthogonally from each lane. Items being stored in the rack, such as loaded pallets, are positioned in the aisles. To retrieve a loaded pallet from a position within an aisle or to deposit a loaded pallet therein, it is necessary for a vehicle, commonly referred to as a transfer robot, to enter the aisle. Because transfer robots are expensive it has been found advantageous to have a single transfer robot service a number of the aisles which extend from a lane rather than to provide a robot for each aisle. To carry the single robot between the various aisles a vehicle commonly referred to as a transfer vehicle, which moves along the lane, is provided.

The use of such transfer vehicles and transfer robots has contributed greatly to the efficiency and economy of modern automated warehouses. Their use has, however, required the development of systems which are capable of apprising such robots and vehicles of their location within the storage system. Clearly, it is necessary that an unloaded transfer robot be aware of the fact that it is underneath the loaded pallet nearest the lane in an aisle so that the robot may retrieve such pallet and carry it to the transfer vehicle, which vehicle will then carry the loaded pallet and the transfer robot to a pick-up area. Similarly, it is necessary that the transfer robot, when carrying a loaded pallet, be aware of its arrival at a position proximate the pallet nearest the lane in an aisle so that the transfer robot may deposit its loaded pallet at that point. It is also necessary, of course, that the transfer vehicle, when carrying a transfer robot (with or without a loaded pallet), be aware of its position in a lane so that the transfer vehicle may stop and off-load the transfer robot at the proper aisle along the lane.

A number of different systems have been developed to provide the required position information to the transfer robot and to the transfer vehicle. For example, U.S. Pat. No. 3,973,685 discloses a system wherein transfer robots are provided with photo-electric sensors extending fore and aft thereof, so that the robots are apprised of their adjacency to the pallet in the aisle nearest to the junction of the aisle and the lane as the transfer robots arrive at such point of adjacency. Such photo-electric sensor systems, although operating satisfactorily in ideal environments, are frequently less than completely satisfactory in actual factory environments. This is due to the fact that substantial articles, such as, for example, pieces of lumber, frequently dangle or extend from the pallets and even portions of the load carried by the pallets themselves frequently dangle or extend therefrom. Such articles dangling or extending from the pallets form obstructions which, when struck by the sensors mounted on the transfer robots, frequently cause the misalignment of such sensor systems resulting in a decrease in the accuracy of the position information provided and even damage such systems to the extent that they become inoperative.

Numerous attempts have also been made to provide a system whereby the transfer vehicle is apprised of its position along a lane relative to each of the aisles extending therefrom. One such system incorporates a plurality of photo-electric sensors mounted on the transfer vehicle and a number of pieces of reflective adhesive tape adhered to stanchions or posts adjacent to each of the aisles. The pieces of tape are arranged in a pattern or code containing information identifying the aisle adjacent to which they are positioned. Such systems, although of value, are less than completely satisfactory for a number of reasons. For example, in a typical warehouse environment, the reflective tape quickly loses a substantial portion of its reflective capability due to grime coating the tape. Clearly, such a circumstance is intolerable in that a loss of reflectivity of a particular piece of the tape will cause the photo-electric system to "read" an incorrect position code. Another problem arises when it is desired to alter the positions of the various pieces of tape forming the code in that each piece of tape, once adhered to a surface, loses a substantial portion of its adhesive capability when removal and re-adhesion of the tape is attempted. Finally, the use of such reflective tape is less than completely satisfactory because the photo-electric sensing system frequently becomes slightly misaligned due to the vibration thereof which is caused by the movement of the transfer vehicle along an aisle. Inasmuch as the angle at which light is reflected from the reflective tape surface is equal to the angle of incidence, that is, the angle at which light is received by the tape, any misalignment of the photo-electric transmitter is magnified by the reflectivity of the tape. It is therefore clear that such a system will work less than completely satisfactorily in the event that light from the photo-electric cell is transmitted other than perpendicularly relative to the reflective surface of the tape.

SUMMARY OF THE INVENTION

It is, therefore, an important object of the instant invention to provide a vehicle position determining system for an automated warehouse by means of which the aforesaid drawbacks and disadvantages may be most efficaciously avoided.

It is a further object of the invention to provide such a system whereby misalignment of, or damage to, sensors mounted on a robot may be avoided.

It is still a further object of the instant invention to provide means for flexibly mounting a position detecting sensor on a robot in an automated storage and retrieval system.

It is yet another object of the instant invention to provide an electro-magnetic wave reflecting system for vehicle position determination in an automated warehouse which is characterized by improved reflectivity.

It is still another object of the instant invention to provide such an improved electro-magnetic wave reflection system which compensates for misalignment of the electro-magnetic wave transmission system.

It is yet a further object of the instant invention to provide an electro-magnetic wave reflecting system for vehicle position determination in an automated warehouse whereby position information contained in said wave reflecting system can readily be varied.

Generally speaking, the objectives of the instant invention are attained by the provision of a vehicle position determining system comprising a vehicle arranged for movement along a path, sensor means coupled to the vehicle and arranged to respond to the alignment of the sensor means with a pre-selected article, and means flexibly coupling the sensor means to the vehicle.

The objectives of the present invention are also attained by the provision of a vehicle position determining system comprising a vehicle arranged for movement along a path, an electro-magnetic wave reflector retaining member, one or more electro-magnetic wave reflectors supported by the retaining member, the reflectors arranged in a location information containing pattern, and electro-magnetic wave transceiver means, one of the retaining member and the transceiver means being coupled to the vehicle and the other being fixedly positioned whereby the transceiver means and the retaining member are arranged for relative movement into and out of alignment with one another, the transceiver means being adapted to provide an output signal related to the pattern upon the alignment of the transceiver means and the reflectors.

The objectives of the present invention are further attained by the provision of a reflector retaining bracket comprising a longitudinally extending rear wall, first and second side walls, the side walls being spaced from one another and extending perpendicularly from a surface of the rear wall, and first and second pluralities of fingers, each of the first and second pluralities of fingers extending perpendicularly from a corresponding one of the first and second side walls and toward one another, the rear and side walls and the pluralities of fingers forming a channel adapted to maintain a plurality of reflectors therein, each of the fingers being adapted to be folded inwardly toward the rear wall for preventing the longitudinal movement, toward the folded fingers, of a reflector positioned in that portion of the channel aligned with the fingers next adjacent to the folded finger.

The objectives of the present invention are also attained by the provision of an electro-magnetic wave transmission mounting bracket comprising a plate having first and second pluralities of apertures formed therein, each aperture of the first plurality corresponding to an aperture of the second plurality, the plate adapted to support a plurality of discrete electro-magnetic wave transceivers each of which transceivers includes a lens and an alignment pin spaced therefrom, which pin extends parallel to the axis of transmission of the lens, each aperture of the first plurality of apertures adapted to be aligned with the lens of one of the plurality of discrete transceivers and to pass electro-magnetic waves transmitted by the discrete transceiver and electro-magnetic waves transmitted to the discrete transceiver, and the corresponding aperture of the second plurality of apertures adapted to receive the alignment pin of the one discrete transceiver, thereby aligning the one transceiver relative to the plate.

The foregoing and other objects and features of the present invention will be more clearly understood from the following detailed description thereof, when read in conjunction with the accompanying drawings, in which:

BRIEF DESCRIPTION OF THE DRAWINGS

FIG. 4A is a detailed plan view of the flexibly mounted sensor system of the invention;

FIG. 4B is a detailed perspective view of the flexible mounting member illustrated in FIG. 4A;

FIG. 4C is an end view of the clamp shown in FIG. 4A;

FIG. 4D is a top view of the clamp shown in FIG. 4A;

DESCRIPTION OF THE PREFERRED EMBODIMENTS

Figure 1:
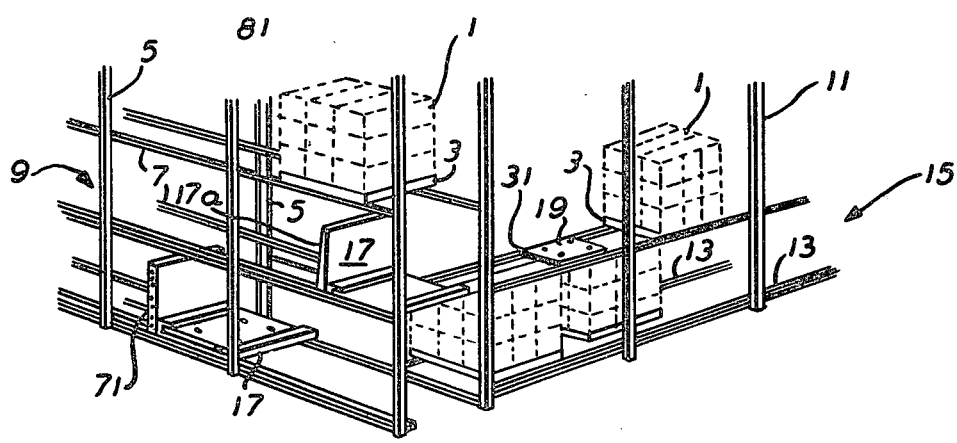
FIG. 1 is a perspective view of an automated warehousing system including the inventive vehicle position determining system.

Referring to the drawings, FIG. 1 illustrates a conventional warehousing system featuring the automatic storage and retrieval of articles, indicated at 1, which articles are carried by pallets indicated at 3. The multi-tiered storage system illustrated is formed by a number of vertical structural members of beams 5 which combine with pairs of horizontal rails 7 (which rails function as tracks) to form lanes 9, three levels of such lanes 9 being illustrated in FIG. 1. A number of vertical members or beams 11 generally comparable to those indicated at 5, are provided, as are a number of pairs of horizontal rail or track member 13, the horizontal rail members 13 being generally comparable to those illustrated at 7. The beams 11 and the tracks 13 combine to form the aisles 15 of the warehousing system and, although only one aisle is illustrated in FIG. 1, it will be understood that a number of aisles 15 are associated with each level of the lanes 9.

As is well known in the art (a typical system being illustrated in U.S. Pat. No. 3,973,685), such systems conventionally include mother vehicles arranged to move along the tracks 7 of the lane 9, such a mother vehicle or transfer vehicle being indicated at 17. The transfer vehicle 17 is arranged to carry a satellite or robot vehicle indicated at 19, to a selected aisle 15 whereupon the robot leaves the mother vehicle and travels to a desired position in such aisle where it deposits or retrieves a loaded pallet 3. As will readily be understood, it is necessary that the warehouse system controller, for example, a computer (not shown), be apprised both of the fact that the transfer vehicle is proximate to the selected aisle (the aisle at which the vehicle 17 is to be parked) and of the fact that the robot vehicle has arrived at a position adjacent to, or in alignment with, the pallet nearest to the lane in an aisle, hereinafter referred to as "the first pallet". It is to provide such information that the instant photo-electric sensor system is provided. It is here noted that although, as just indicated, it is the warehouse system controller which must be informed of the location of the transfer vehicle and the location of the robot vehicle, for purposes of clarity the system will be discussed below in terms of the robot vehicle and transfer vehicle being apprised of their respective locations. Referring to FIGS. 2-4D the system providing information as to robot position will now be discussed in detail. As previously noted, the robot vehicle 19 will be discharged from the transfer vehicle 17 in an unloaded condition when it is desired to retrieve a pallet 3 from an aisle 15. Conversely, the robot vehicle will be discharged in a loaded condition when it is desired to store a pallet 3 in an aisle 15. In either event, it is necessary that the robot vehicle 19 be aware of its position in an aisle relative to the "first" loaded pallet therein. For example, if the robot vehicle 19 has been discharged from the transfer vehicle 17 for the purpose of retrieving a loaded pallet 3, the robot vehicle must stop when it is under such "first" loaded pallet so that the pallet may be retrieved. If the robot vehicle is to deposit a loaded pallet in the aisle then the robot vehicle must sense when its leading edge is adjacent to the first pallet in the aisle so that it may stop and deposit the pallet it is carrying adjacent to the previously first pallet in the aisle. To accomplish this task two separate photo-electric transceivers have conventionally been provided, such transceivers being indicated at 31 and 33. The transceiver 31 functions when the robot is moving in the direction indicated by the arrow 34 to locate the leading edge of the first loaded pallet already in the aisle when it is desired that the robot vehicle 19 deposit a pallet in the aisle and the photo-electric transceiver 33 is utilized when it is desired to retrieve the first loaded pallet in the aisle. At this point it is appropriate to note that although the warehousing system illustrated in FIG. 1 shows aisles 15 extending in only one direction from the lanes 9, warehousing systems are frequently arranged so that aisles 15 extend in both directions from each of the lanes 9. It is for this reason that the robot vehicle 19 is illustrated as having four photo-electric transceivers mounted thereon. The transceivers indicated at 35 and 37 (FIG. 3) correspond to the transceivers 31 and 33, respectively, and are utilized when the robot vehicle 19 is discharged from the transfer vehicle 17 in the direction illustrated by the dashed lines in FIG. 2 and indicated by the arrow 38 in FIG. 3. The mode of operation of these photo-electric sensors is conventional in the art (see U.S. Pat. No. 3,973,685) and such operation will therefore not be more fully discussed. As previously noted, however, the sensors of such systems are subject to breakage due to their coming into contact with objects over-hanging or otherwise depending from pallets in the aisles. It has therefore been found advantageous to resiliently mount each of the sensors 31 and 35 on the robot vehicle by means of a flexible structure 41, which structure is illustrated in detail in FIG. 4A.

Figure 2:
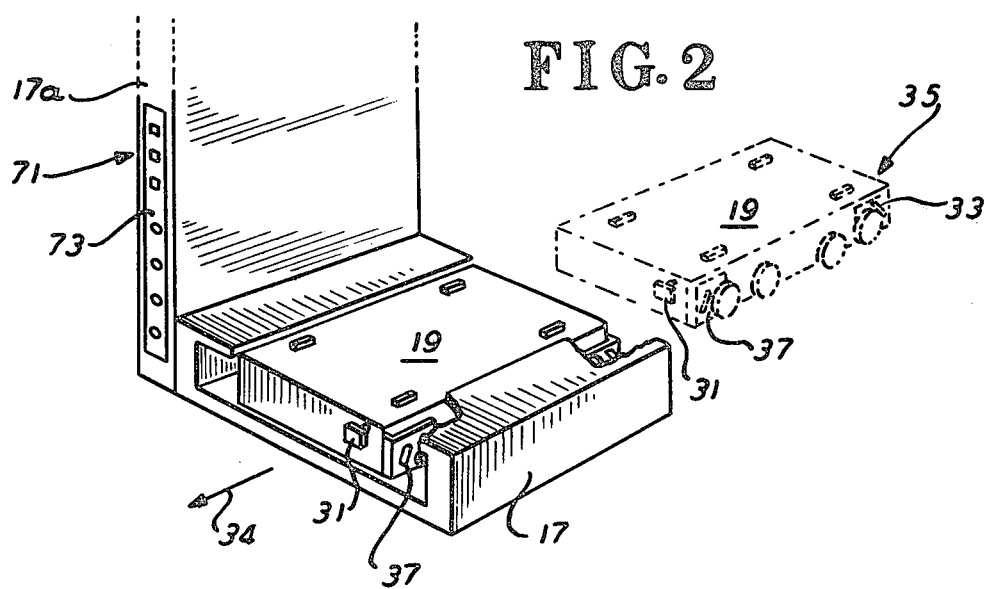
FIG. 2 is a detailed perspective view of the transfer vehicle and robot vehicle of the warehousing system including the inventive vehicle position determining system.
Figure 3:
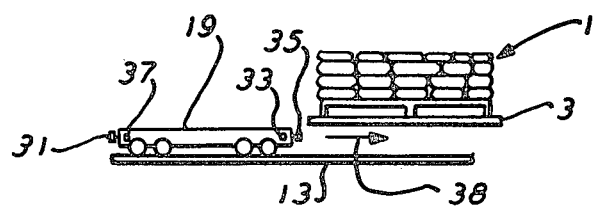
FIG. 3 is a schematic plan view of a robot vehicle, including the inventive vehicle determining system, proximate to a loaded pallet in a warehouse.

The resilient sensor mounting structure 41, includes a tubular member 43 which may be made of any relatively resilient material such as, for example, a plastic. In particular, urethane has been found to be a suitable material. Coupled to the tubular member 43, or formed as a portion thereof, is a sensor retainer 45 which supports a photo-electric transceiver (transmitter and receiver combination) here indicated as the transceiver 31. The retainer 45 may advantageously be made of a relatively strong material such as aluminum or a plastic and the retainer 45 is fixedly connected to the tubular member 43 in any conventional manner. The retainer 45 may, of course as indicated above, be formed as an integral portion of the flexible structure 41 in which event the retainer 45 is made of a strong resilient material such as urethane as is the remainder of the mounting structure 41. The tubular member 43, which is illustrated in detail in FIG. 4B, is formed with chamfered edges 47 so as to prevent damage to electrical cables 49 which couple the sensor 31 to a receiving unit (not shown) and which pass through the interior passage 51 of the tubular member 43. The tubular member 43 is slideably coupled to the robot vehicle 19 by a clamp 61. As illustrated, the clamp 61 includes an upper portion 61a and a lower portion 61b, each portion being formed with a semi-circular groove therein, which grooves are adapted to surround and grip the tubular member 43. The upper and lower clamp sections 61a and 61b, are urged together by means of screws indicated at 63 and the clamp unit 61 is fixedly connected to any convenient interior portion of the robot vehicle 19, for example, a portion denominated as 19a by screws 65. Referring briefly to FIGS. 2 and 3, it is seen that the sensor retainer 45 and a portion of the flexible tube 43 extend beyond the fore and aft ends of the robot vehicle 19, the remainder of the tubular member 43 and the clamp 61 being located within the interior of the robot vehicle 19. The just described structure coupling the tubular member 43 to the robot 19 renders the flexible rod 43 and, of course, the sensor 31, slideably moveable longitudinally relative to the robot vehicle 19. In this manner the distance that the sensors extend beyond the forward and rear ends of the robot vehicle may be selectively varied and this, in turn, permits the time between when a pallet is sensed and the time when the body of the robot vehicle arrives at the sensed pallet to be selectively varied. It will, of course, be understood that the resiliency of the tubular member 41 prevents damage to, and misalignment of, the photo-electric sensors 31 in the event that the sensor retainer 45 contacts an obstruction, such as a piece of lumber, in an aisle and that the sensor, within the retainer, will simply return to its correct position, after such obstruction has been removed.

As previously noted, it is not only necessary that the robot vehicle 19 be aware of its position relative to the "first" pallet in an aisle but it is also necessary that the transfer vehicle 17 be aware of its position relative to each aisle as it moves along the tracks 7 of a lane 9. To accomplish this end a photo-electric transceiver network, indicated generally at 71, is mounted on the transfer vehicle 17 by means of a transceiver mounting bracket or plate indicated at 73, which mounting bracket is illustrated in detail in FIG. 6. Mounted adjacent to each aisle 15, on, for example, a stanchion, (not shown) or on each vertical beam 5, is a photo-electric reflector mounting bracket 81 which is illustrated in detail in FIGS. 5A and 5B. It is here appropriate to indicate that, although the reflector bracket 81 is illustrated in FIG. 1 as being mounted on the vertical beams 5 (facing inwardly) so as to be proximate to an aisle 15 to be identified, it will be clear that the reflector mounting bracket 81 may be mounted in a location and a manner other than that discussed above, the only requirement being that the bracket be so located as to be able to identify an aisle. Turning first to a discussion of the reflector mounting bracket 81 and referring to FIGS. 5A and 5B, it is noted that the bracket may be made of any conventional material such as, for example, sheet metal. As seen most clearly in FIG. 5B, the bracket 81 has a generally "C" shaped cross-sectional configuration. The bracket includes a longitudinally extending rear wall 83 and first and second side walls 85 and 87, each of which side walls extend perpendicularly from the same surface and from a respective end of the rear wall 83. The bracket 81 further includes first and second pluralities of fingers, 89 and 91, which extend from the side walls 85 and 87, respectively. The pluralities of fingers 89 and 91 both extend inwardly, that is, toward one another, and both pluralities extend parallel to the rear wall 83. The combination of the rear wall 83, the side walls 85 and 87, and the fingers 89 and 91 thus provides a structure which forms a channel into which reflectors may be placed and which is therefore suitable for use as a retaining member.

Figure 5A:
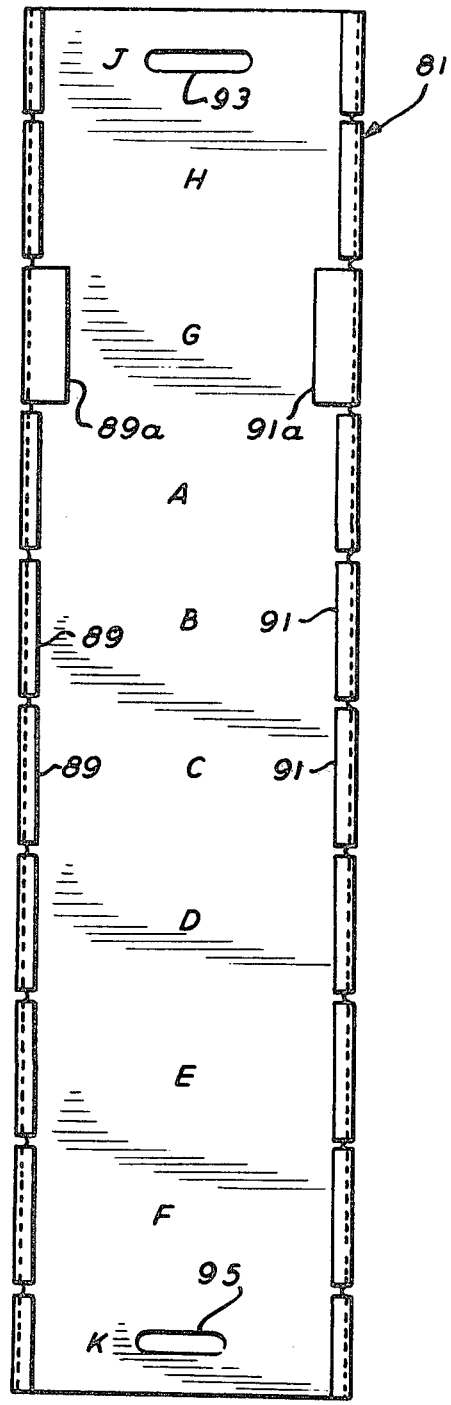
FIG. 5A is a plan view of the inventive reflector mounting bracket of the instant invention.
Figure 5B:
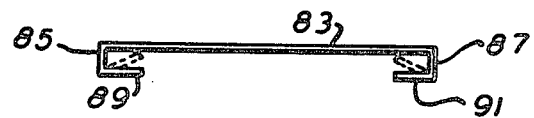
FIG. 5B is a top view of the bracket illustrated in FIG. 5A.

Referring to FIG. 5A, it may be seen that each finger of the two pluralities of fingers 89 and 91 is independent of each other finger. It will therefore be understood that each finger may be separately folded inward toward the wall 83, as indicated by the dashed lines in FIG. 5B and in this manner provide support for a photo-electric reflector. Thus, a photo-electric reflector may be maintained in any position by folding the finger pair next adjacent to such position inwardly toward the rear wall 83. It is here noted that although a single inwardly folded finger is sufficient to maintain a reflector, superior support may be provided by inwardly folding two corresponding (facing) fingers, i.e., one of the fingers 89 and the finger 91 corresponding thereto. It will be understood, of course, that if it is desired to maintain a reflector in a particular position then the finger pair 89-91 of that position will not be folded inwardly as indicated by the dashed lines in FIG. 5B, but rather, will be in the position there shown in solid lines.

The embodiment of the bracket 81 illustrated in FIG. 5A is structured to provide six positions for reflectors which are arranged in a pattern containing location information, that is, are arranged in a code. These six positions are indicated at A-F. The location information may, for example, be contained in a simple binary code where position A is the position of the least significant digit. Thus, if a single reflector is at position A, the transceiver 71 is arranged to provide an output signal indicating that the transfer vehicle 17 is at the first of the aisles. Similarly, if reflectors are in positions A and D, then the transceiver 71 will provide an output signal indicating that the transfer vehicle is at the ninth of the aisles 15. The reflector position adjacent to position A, which adjacent position is indicated at G, is aligned with fingers 89a and 91a which are similar to the fingers 89 and 91. The fingers 89a and 91a are distinguished from the fingers 89 and 91 in that the former extend a greater distance toward one another than do the fingers 89 and 91. The purpose of this structure of the fingers 89a and 91a is to enable them to cover a greater portion of the reflector which will be located in position G than is the case with respect to the reflectors positioned in the locations A-F. The reason why it is desired that a greater portion of the reflector in location G be covered, that is, that the reflector have a lesser reflective expanse, will be discussed in detail below. The reflector position next adjacent to position G is indicated at H and this position is utilized for the fine positioning of the transfer vehicle 17 in a manner which will be discussed below. It will be noted that the two outermost reflector positions of the retainer 81, indicated at J and K, do not extend as great a distance, in a longitudinal direction, as do the reflector positions A-H. In point of fact, the positions J and K each have a longitudinal extent approximately one-half of that of the remaining reflector positions and this is due to the fact that the positions J and K are utilized only when the code is such that two photo-electric reflector retainers 81 are to be coupled together. In such event the J position of the first retainer 81 will be adjacent to the K position of the second retainer 81 thereby forming a full reflector position, i.e., a position adapted to receive a reflector comparable to the reflectors which may be placed in positions A-H.

A pair of slots, indicated at 93 and 95, are formed in the retainer 81 and these slots are arranged to receive coupling members (not shown) for connecting the retainers 81 to the beams 5 (or other support members). For example, screws may be utilized to connect the retaining members 81 to the beams 5 or clips may be used for this purpose. The slots 93 and 95 are arranged to extend transversely relative to the longitudinal extent of the retaining member 81 so that the retaining member may be moved in the transverse direction for purposes of adjustment.

It will be understood that many different types of reflectors may be utilized in the instant invention, the type of reflector selected depending in part on the sensing means selected. However, the type of reflector advantageously utilized with the photo-electric sensing means here described is a conventional motor truck type of reflector commonly known as a "corner cube" which, as is well known, has a smooth exposed surface and a faceted rear mounting surface. Such reflectors are here preferred because it is a characteristic of such reflectors that they reflect any light received back in the direction from which it is transmitted, even when such light is not transmitted perpendicularly to their receiving face. Although, as previously noted, other types of reflectors, for example, reflective tape, could here be utilized, it has been found that the corner-cube reflectors are superior for a number of reasons in addition to their ability to reflect light on the line of transmission. For example, the reflective surface of a corner-cube reflector does not become grimy, with a concomitant loss of reflectivity as quickly as does tape. Further, a corner-cube reflector may be more readily and thoroughly cleaned by merely wiping it with a damp cloth than can a tape. Finally, the position of the reflectors in a retainer can be more readily changed, thereby changing the information contained in the reflector pattern, than is true of reflective tapes which must be peeled from a mounting stanchion and repositioned (with a loss of adhesiveness) when it is desired to change the information contained in the tape pattern.

Figure 6:
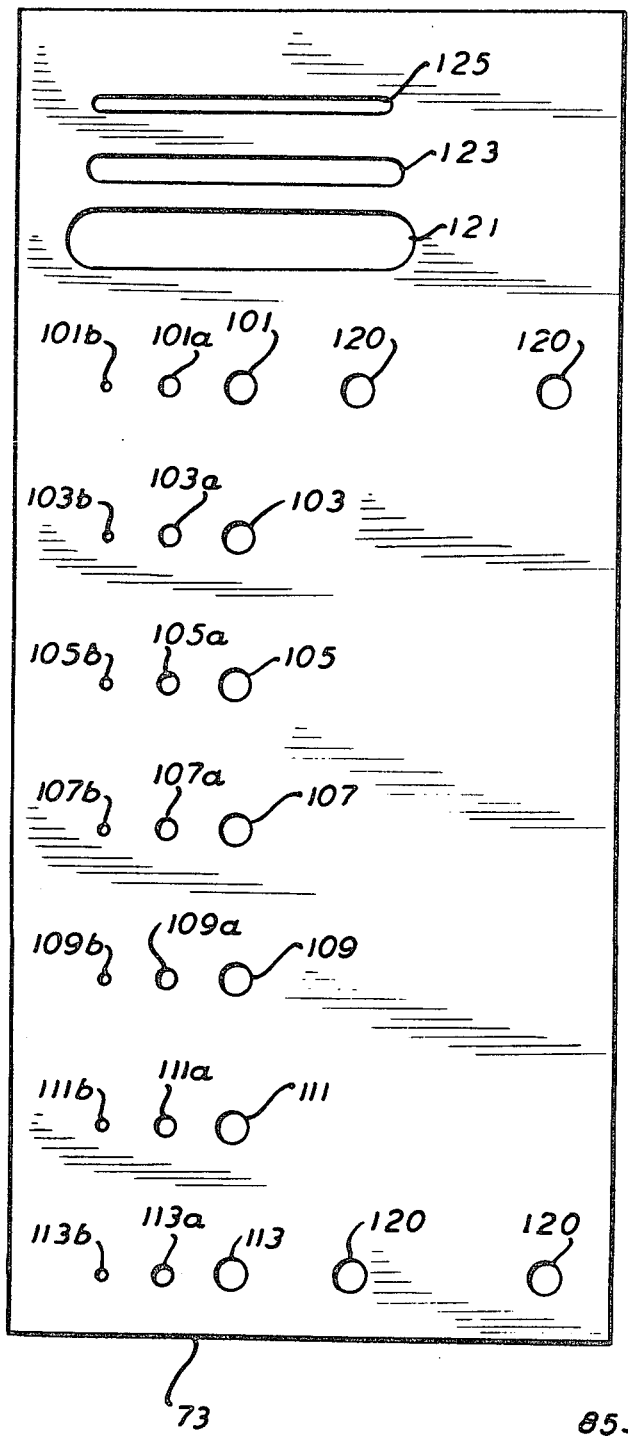
FIG. 6 is a plan view of the scanner mounting plate of the instant invention.

The transceiver mounting bracket 73 is illustrated in detail in FIG. 6 and it is utilized to attach the photo-electric transceiver or scanner 71 to the vertical portion of the transfer vehicle 17, which vertical portion is indicated at 17a. The individual photo-electric transceivers, which together form the transceiver or scanner 71, are conventional and of the type which include a lens system adapted to both transmit and receive light. In addition, the body or casing of the transceiver includes an alignment pin spaced from the lens, which alignment pin extends parallel to the axis of transmission of the lens, and the casing is formed with a threaded aperture which is adapted to receive a mounting screw. Although the structure and operation of the individual transceivers is conventional and will therefore not further be discussed, the mounting bracket for, and the arrangement of, the conventional transceivers is part of the instant invention and the bracket and arrangement therefore will be discussed in detail. The transceiver bracket 73 may be made of any conventional material such as, for example, sheet metal and it is formed with a plurality of circular apertures therein. There are three sizes of such circular apertures and the largest of the apertures are indicated at 101, 103, 107, 109, 111 and 113. The apertures 101-113 are provided so that the lenses of the individual photo-electric transceivers, which are positioned at the rear of the mounting bracket 73, may be aligned with and transmit and receive light therethrough. Adjacent to the largest circular apertures 101-113 are smaller circular apertures indicated at 101a-113a, the latter apertures being aligned transversely with the apertures 101-113. The apertures 101a-113a are so located in the bracket 73 that each may be aligned with the threaded aperture in the transceiver casing corresponding thereto. Mounting means, such as, for example, screws, may thus pass through the apertures 101a-113a and into the corresponding threaded apertures in the transceivers whereby the individual transceivers may be attached to the bracket 73. Located adjacent to the apertures 101a-113a, and transversely aligned therewith, are the smallest apertures, indicated at 101b-113b. The purpose of the apertures 101b-113b is to receive the transceiver casing alignment pins and thereby insure the alignment of each of the transceiver lenses with the corresponding aperture 101-113. Formed in the bracket 73 are four circular apertures, indicated at 120, which circular apertures are arranged to receive shock suppressing devices, for example, rubber grommets, which serve to isolate the photo-electric transceiver mounting bracket 73 (and the transceiver 71) from the vibration of the transfer vehicle 17.

As will readily be understood, the photo-electric transceiver means 71 is mounted, via the bracket 73, so that it will come into alignment with the reflectors (A-H) positioned in the reflector mounting structure 81 as the transfer vehicle 17 moves along the lane 9. It is appropriate to note at this time that, although in the embodiment illustrated both the reflector bracket 81 and the transceiver mounting bracket 73 are vertically oriented, comparable results may be obtained, with only minor obvious modifications, if both the transceiver support bracket 73 and the reflector mounting bracket 81 are horizontally oriented. Returning now to the embodiment illustrated, it will be understood that the individual photo-electric transceivers 103-113 (each discrete photo-electric transceiver being identified by the numeral indicating the aperture with which such transceiver lens is aligned) are arranged and spaced so as to be aligned with the reflectors A-F, respectively, as the transceiver 71 moves into vertical alignment with the reflector mounting bracket 81. Thus, the transceiver 103 responds to the reflection from a reflector in position A and the transceiver 111 responds to the reflection from a reflector in position E. The transceiver 71 mounted in the bracket 73 is therefore able to provide an output signal (which can be decoded in any conventional manner) which is related to the location information containing pattern or code of the reflectors A-F.

As has just been noted, the transceivers 103-113 correspond to, i.e., are aligned with, the reflector positions A-F. It will therefore be understood that the transceiver 101 will be aligned with the reflector at location G in the mounting bracket 81. The reason that the fingers 89a and 91a are arranged to extend somewhat further toward one another than do the remainder of the fingers 89 and 91 will now be discussed. It will be seen that, as the transceiver 71, mounted on the vertical portion 17a of the transfer vehicle 17, moves into alignment with the reflectors mounted on the reflector mount 81, the discrete transceiver 101 will receive a reflection from the reflector at location G after the remaining transceivers (103-113) receive reflections from the reflectors A-F. This is because the fingers 89a and 91a, which are constructed from the same non-reflective material as the remainder of the retaining member 81, prevent reflection. The transceiver 101 will therefore have to be more nearly aligned with the center of the reflector G, before a reflected photo-electric signal is received, than would be the case if the fingers 89a and 91a extended toward one another only as far as the fingers 89 and 91. The combination of the transceiver 101 and the fingers 89a and 91a is therefore particularly suitable for use as a switch initiating the operation of the transceivers 103-113. This is because the use of such a switching control prevents the activation, for the transmission and reception of photo-electric signals, of the transceivers 103-113 before they are properly aligned with the reflectors in positions A-F and the possibility of spurious readings, which could occur if the transceivers 103-113 responded to the leading and trailing edges of the reflectors A-F, is therefore minimized.

As illustrated in FIG. 6, three transversely extending slots, indicated at 121, 123, and 125, are formed in the mounting plate 73, these slots being provided for receiving two discrete photo-electric transceivers. The slot 125 corresponds generally to the circular apertures 101b-113b in that the slot 125 is adapted to receive the transceiver alignment pins of the two transceivers. The slot 123 corresponds generally to the circular apertures 101a-113a in that the slot 123 is adapted to receive the threaded screws for mounting the two transceivers to the plate 73. The slot 121 corresponds generally to the circular apertures 101-113 in that the slot 121 is adapted to receive, or be aligned with, the lenses of the two transceivers. The two photo-electric transceivers are arranged to be individually moveable along the longitudinal axes of the slots. Thus, either or both transceivers may be moved to the left or to the right and they can be moved toward one another or away from one another. This arrangement of the pair of photo-electric transceivers, the lenses of which are aligned with the slot 121, functions as a fine alignment mechanism. Referring to FIGS. 5A and 6, it will be seen that the slot 121 is aligned with a reflector in the position H of the bracket 81. By controlling the movement of a transfer vehicle 17 which is already near an aisle 15 so that the vehicle jogs to and fro until both of the transceivers 121 receive reflections from the reflector H, the position of the transfer vehicle relative to the aisle 15 may be finely controlled. In point of fact, the precision with which the position of the transfer vehicle 17 is controlled is dependent upon the spacing between the two transceivers 121. Thus, if the two transceivers 121 are spaced relatively closely together, they will both receive reflections from the reflector H although the vehicle 17 is rather coarsely aligned with an aisle 15. On the other hand, when the two transceivers 121 are spaced relatively far apart, the alignment of the vehicle 17 with an aisle 15 will, of necessity, be relatively more precise if the transceivers 121 are able to simultaneously receive reflections from the reflector in position H. It is therefore seen that the just described fine alignment arrangement is suitable for precisely aligning a vehicle 17 with an aisle 15 and that it further is an arrangement which permits control of the degree of such precision of alignment.

Although the invention system has here been described in terms of photo-electric transceivers, the instant system could also be utilized with other forms of energy which can be reflected such as, for example, infra-red radiation, magnetism, etc., and the subject system may therefore be referred to as an electro-magnetic or electro-optical wave system, rather than merely as a photo-electric system.

It will be understood that the foregoing description of the preferred embodiment of the present invention is for purposes of illustration only and that the various structural and operational features as herein disclosed are susceptible to a number of modifications and changes, none of which entail any departure from the spirit and scope of the present invention as defined in the hereto appended claims.

What is claimed is:

1. A reflector retaining bracket comprising:
   a longitudinally extending rear wall;
   first and second side walls, said side walls being spaced from one another and extending perpendicular from a surface of said rear wall; and
   first and second pluralities of fingers, each of said first and second pluralities of fingers extending perpendicularly from a corresponding one of said first and second side walls and toward one another,
   said rear and side walls and said pluralities of fingers forming a channel adapted to maintain a plurality of reflectors therein,
   each of said fingers being adapted to be folded inwardly toward said rear wall for preventing the longitudinal movement, toward said folded finger, of a reflector positioned in that portion of said channel aligned with the fingers next adjacent to said folded finger.

2. A reflector retaining bracket according to claim 1 wherein each finger of said first plurality of fingers is aligned transversly, with respect to said longitudinal direction, with a corresponding finger of said second plurality of fingers.

3. A reflector retaining bracket according to claim 2 wherein a selected finger of said first plurality and the corresponding finger of said second plurality each extend a greater distance toward one another then do the remaining fingers of said first and second pluralities of fingers.

4. A reflector retaining bracket comprising:
   a vertically oriented longitudinally extending rear wall;
   first and second side walls, said side walls being spaced from one another and extending perpendicularly from a surface of said rear wall; and
   first and second pluralities of fingers, each of said first and second pluralities of fingers extending perpendicularly from a corresponding one of said first and second side walls and toward one another,
   said rear and side walls and said pluralities of fingers forming a channel adapted to maintain a plurality of vertically arrayed reflectors therein,
   each of said fingers being adapted to be folded inwardly toward said rear wall so that the space between said fingers and said rear wall is less than the thickness of said reflectors whereby the lower edge of a reflector is supported by a pair of fingers thereby preventing the longitudinal movement, in the direction of said folded fingers, of a reflector positioned in that portion of said channel aligned with the fingers next adjacent to said folded fingers.

* * * * *